(12) United States Patent
Bohling et al.

(10) Patent No.: US 11,981,830 B2
(45) Date of Patent: May 14, 2024

(54) AQUEOUS DISPERSION OF POLYMER PARTICLES, MICROSPHERES, AND POLYSILOXANE PARTICLES

(71) Applicants: Rohm and Haas Company, Collegeville, PA (US); Dow Silicones Corporation, Midland, MI (US)

(72) Inventors: James C. Bohling, Lansdale, PA (US); Ibrahim Eryazici, Phoenixville, PA (US); Bradley K. Hageman, Pottstown, PA (US); Philip R. Harsh, Birdsboro, PA (US); Yihan Liu, Midland, MI (US); Partha S. Majumdar, Harleysville, PA (US); Edwin A. Nungesser, Horsham, PA (US); Timothy A. Roggow, II, Chesaning, MI (US)

(73) Assignees: Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 624 days.

(21) Appl. No.: 17/283,620

(22) PCT Filed: Oct. 22, 2019

(86) PCT No.: PCT/US2019/057380
§ 371 (c)(1),
(2) Date: Apr. 8, 2021

(87) PCT Pub. No.: WO2020/086545
PCT Pub. Date: Apr. 30, 2020

(65) Prior Publication Data
US 2021/0348005 A1    Nov. 11, 2021

Related U.S. Application Data

(60) Provisional application No. 62/749,788, filed on Oct. 24, 2018.

(51) Int. Cl.
| | | |
|---|---|---|
| C09D 7/42 | (2018.01) |
| C08F 220/14 | (2006.01) |
| C08F 220/18 | (2006.01) |
| C08F 220/40 | (2006.01) |
| C08F 230/02 | (2006.01) |
| C08F 265/06 | (2006.01) |
| C08G 77/12 | (2006.01) |
| C08K 3/22 | (2006.01) |
| C08L 75/04 | (2006.01) |
| C08L 83/06 | (2006.01) |
| C09D 5/02 | (2006.01) |
| C09D 7/40 | (2018.01) |

(52) U.S. Cl.
CPC .............. *C09D 7/42* (2018.01); *C08F 220/14* (2013.01); *C08F 220/1802* (2020.02); *C08F 220/1804* (2020.02); *C08F 220/40* (2013.01); *C08F 230/02* (2013.01); *C08F 265/06* (2013.01); *C08G 77/12* (2013.01); *C08K 3/22* (2013.01); *C08L 75/04* (2013.01); *C08L 83/06* (2013.01); *C09D 5/028* (2013.01); *C09D 7/67* (2018.01); *C09D 7/68* (2018.01); *C09D 7/69* (2018.01); *C09D 7/70* (2018.01); *C08G 2150/00* (2013.01); *C08K 2003/2241* (2013.01); *C08K 2201/005* (2013.01); *C08K 2201/011* (2013.01); *C08L 2201/54* (2013.01); *C08L 2205/18* (2013.01)

(58) Field of Classification Search
None
See application file for complete search history.

(56) References Cited

U.S. PATENT DOCUMENTS

| | | | |
|---|---|---|---|
| 4,403,003 A | 9/1983 | Backhouse | |
| 5,385,975 A * | 1/1995 | Nakamura | ............... C09D 7/67 525/902 |
| 7,768,602 B2 | 8/2010 | LaFleur et al. | |
| 7,829,626 B2 | 11/2010 | Chiou et al. | |
| 8,686,096 B2 | 4/2014 | Deetz et al. | |
| 2013/0052454 A1 | 2/2013 | Donovan et al. | |
| 2017/0058371 A1 | 3/2017 | Eryazici et al. | |

FOREIGN PATENT DOCUMENTS

| | | |
|---|---|---|
| EP | 1944342 | 7/2008 |
| EP | 3135701 | 3/2017 |
| WO | 2018071088 | 4/2018 |

* cited by examiner

*Primary Examiner* — Sheeba Ahmed
(74) *Attorney, Agent, or Firm* — Reid S. Willis

(57) ABSTRACT

The present invention relates to a paint composition comprising an aqueous dispersion of a) polymer particles having an average particle size in the range of from 80 nm to 500 nm; b) polymeric organic crosslinked microspheres having a particle size in the range of from 1 μm to 20 μm; c) polysiloxane particles having a particle size in the range of from 1 μm to 30 μm; d) a rheology modifier; e) an opacifying white pigment having a refractive index of >1.9; and f) less than 10 weight percent of a low $T_g$ polyurethane. The composition of the present invention gives coatings with excellent burnish resistance.

10 Claims, No Drawings

AQUEOUS DISPERSION OF POLYMER PARTICLES, MICROSPHERES, AND POLYSILOXANE PARTICLES

BACKGROUND OF THE INVENTION

The present invention relates to a paint composition comprising an aqueous dispersion of polymer particles (a latex), microspheres, and polysiloxane particles; the paint composition is useful for preparing coatings with improved burnish resistance.

Achieving the performance attributes of a semi-gloss coating with the sheen of a traditional matte coating is a lofty and, thus far, an unmet goal. Matte coatings are desirable for their ability to obscure surface imperfections in a substrate. The control of gloss, which is critical in the design of these low sheen decorative paints, is accomplished with matting agents (also known as extenders or dulling agents), which are inorganic particles of calcium carbonate, silica, clay, talc, and the like.

Matting agents lower the sheen by increasing the surface roughness of the film; unfortunately, traditional matting agents compromise the durability and performance of the resulting film. Therefore, matte coatings are not used in high traffic areas due to poor burnish resistance properties (unwanted increase of sheen/gloss arising from rubbing or abrasion). Accordingly, it would be advantageous to design a matte coating composition that forms a coating with improved burnish resistance.

SUMMARY OF THE INVENTION

The present invention addresses a need in the art by providing a paint composition comprising an aqueous dispersion of:
a) polymer particles having a z-average particle size in the range of from 80 nm to 500 nm;
b) polymeric organic crosslinked microspheres having an average particle size in the range of from 1 μm to 20 μm;
c) polysiloxane particles having an average particle size in the range of from 1 μm to 30 μm;
d) a rheology modifier;
e) an opacifying white pigment having a refractive index of >1.9 at a pigment volume concentration in the range of from 1 to 30, with the proviso that when the pigment volume concentration of the opacifying white pigment is less than 10, the paint composition comprises a non-white colorant in the range of from 5 to 20 weight percent solids based on the weight of the paint composition; and
f) less than 10 weight percent, based on the weight of the polymer particles, of a polyurethane having a $T_g$<0° C.;
wherein the concentration of the polymer particles and the crosslinked microspheres is in the range of 10 to 65 weight percent, based on the weight of the paint composition;
wherein weight-to-weight ratio of polymer particles to crosslinked microspheres is in the range of from 1.1:1 to 20:1; the concentration of polysiloxane particles is in the range from 0.05 to 5 weight percent, based on the weight of the paint composition; and the concentration of the rheology modifier is in the range of from 0.1 to 5 weight percent, based on the weight of the paint composition.

The present invention addresses a need in the art by providing a composition that gives a matte finish with the burnish resistance of a semi-gloss painted substrate.

DETAILED DESCRIPTION OF THE INVENTION

The present invention is a paint composition comprising an aqueous dispersion of:
a) polymer particles having a z-average particle size in the range of from 80 nm to 500 nm;
b) polymeric organic crosslinked microspheres having an average particle size in the range of from 1 μm to 20 μm;
c) polysiloxane particles having an average particle size in the range of from 1 μm to 30 μm;
d) a rheology modifier;
e) an opacifying white pigment having a refractive index of >1.9 at a pigment volume concentration in the range of from 1 to 30, with the proviso that when the pigment volume concentration of the opacifying white pigment is less than 10, the paint composition comprises a non-white colorant in the range of from 5 to 20 weight percent solids based on the weight of the paint composition; and
f) less than 10 weight percent, based on the weight of the polymer particles, of a polyurethane having a $T_g$<0° C.
wherein the concentration of the polymer particles and the crosslinked microspheres is in the range of 10 to 65 weight percent, based on the weight of the paint composition;
wherein weight-to-weight ratio of polymer particles to crosslinked microspheres is in the range of from 1.1:1 to 20:1; the concentration of polysiloxane particles is in the range from 0.05 to 5 weight percent, based on the weight of the paint composition; and the concentration of the rheology modifier is in the range of from 0.1 to 5 weight percent, based on the weight of the paint composition.

The polymer particles are preferably acrylic based, meaning these polymer particles comprise at least 30 weight percent, based on the weight of the polymer particles, of structural units of one or more methacrylate monomers such as methyl methacrylate and ethyl methacrylate, and/or one or more acrylate monomers such as methyl acrylate, ethyl acrylate, butyl acrylate, 2-propylheptyl acrylate, and 2-ethylhexyl acrylate. The acrylic-based polymers may also include structural units of ethylenically unsaturated carboxylic acid monomers such as methacrylic acid, acrylic acid, and itaconic acid, or salts thereof, as well as structural units of phosphorus acid monomers such as phosphoethyl methacrylate or a salt thereof.

The polymer particles may also include structural units of other non-acrylate or methacrylate monomers such as styrene and vinyl acetate. The polymer particles are preferably film-forming below room temperature; and preferably have a calculated $T_g$ by the Fox equation of <20° C., more preferably <15° C.

Preferably, the polymer particles further comprise, based on the weight of the polymer particles and the polymeric organic microspheres, from 0.05, more preferably from 0.5, to 12 more preferably to 5 weight percent structural units of a monomer with keto functionality, including acetoacetoxyethyl methacrylate (AAEM) or diacetone acrylamide (DAAM).

If the polymer particles are functionalized with structural units of a monomer with keto functionality, the paint composition advantageously includes from 0.1, preferably from 0.2, and more preferably from 0.5 weight percent, to 10, and preferably to 5 weight percent, based on the weight of the polymer particles and microspheres, of a dihydrazide or polyamine crosslinking agent. Examples of polyamine crosslinking agents include diamines such as 3,3'-(ethane-1,2-diylbis(oxy))bis(propan-1-amine); 4,9-dioxadodecane-1,12-diamine; 4,9-dioxadodecane-1,12-diamine; 4,7-dioxadodecane-1,10-diamine; and 4,7,10-trioxatridecane-1,13-diamine Commercial examples of polyamines are polyetheramines such as JEFFAMINE D-230, JEFFAMINE D-400, JEFFAMINE D-2000, JEFFAMINE M-600, JD-FAMINE M-1000, JEFFAMINE ED-600, JEFFAMINE ED-900, T-403, and JEFFAMINE T-3000 polyetheramines. When the monomer with keto functionality is DAAM, the composition preferably includes a dihydrazide crosslinking agent, such as adipic acid dihydrazide (ADH), carbodihydrazide (CDH), sebacic acid dihydrazide (SDH), valine dihydrazide (VDH), isophthalic dihydrazide (ISODH), and icosanedioic hydrazide ICODH). Preferably, the crosslinking agent for DAAM functionalized polymer particles is a dihydrazide, more preferably ADH.

The term "structural unit" is used herein to describe the remnant of the recited monomer after polymerization. For example, a structural unit of methyl methacrylate is as illustrated:

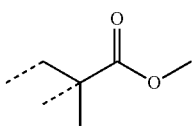

structural unit of methyl methacrylate where the dotted lines represent the points of attachment of the structural unit to the polymer backbone.

The concentration of the polymer particles is preferably in the range of from 10, more preferably from 15 weight percent, to 35, more preferably to 30, and most preferably to 25 weight percent, based on the weight of the paint composition. Preferably, the z-average particle size of the polymer particles is in the range of from 100 nm to 300 nm, more preferably to 250 nm as measured using a Brookhaven BI90 particle analyzer or a comparable dynamic light scattering instrument.

The polymeric organic crosslinked microspheres preferably comprise a low $T_g$ first stage ($\leq 20°$ C., preferably $<10°$ C., and more preferably $<0°$ C., as calculated by the Fox equation) polymer that is crosslinked to provide resiliency and no diffusion to the substrate; and a high $T_g$ second stage ($\geq 30°$ C., preferably greater than $50°$ C., as calculated by the Fox equation) to provide microspheres that are not film-forming at room temperature.

Preferably, at least 50, more preferably at least 70, and most preferably at least 90 weight percent of the crosslinked first stage comprises structural units of I) methyl acrylate, butyl acrylate, or ethyl acrylate or a combination thereof; and II) a multiethylenically unsaturated nonionic monomer, exemplified hereinbelow, at a w/w ratio in the range of from 99.5:0.5 to 90:10; preferably, methyl methacrylate comprises at least 60, more preferably at least 80, and most preferably at least 90 weight percent of the second stage.

The polymeric organic crosslinked microspheres have an average particle size (technically, a median weight average particle size, $D_{50}$) in the range of from 2 μm, preferably from 4 μm, to 20 μm, preferably 15 μm, as measured using a Disc Centrifuge Photosedimentometer as described hereinbelow. Aqueous dispersions of crosslinked microspheres can be prepared in a variety of ways, including those described in US Pat. Pub. 2013/0052454; U.S. Pat. Nos. 4,403,003; 7,768,602; and 7,829,626.

In a preferred method of preparing an aqueous dispersion of polymeric organic crosslinked multistage microspheres (Preferred Method A), an aqueous dispersion of first microspheres comprising structural units of a first monoethylenically unsaturated nonionic monomer is contacted under polymerization conditions with first stage monomers comprising, based on the weight of the first stage monomers, from a) 0.05 to 5 weight percent of a polymerizable organic phosphate or a salt thereof; and b) from 70 to 99.95 weight percent of a second monoethylenically unsaturated nonionic monomer, to grow out the first microspheres to form an aqueous dispersion of organic phosphate functionalized second microspheres, wherein the first microspheres have a particle size in the range of from 1 μm to 15 μm and the second microspheres have a particle size in the range of from 1.1 μm and 20 μm; and wherein the polymerizable organic phosphate is represented by the structure of Formula I:

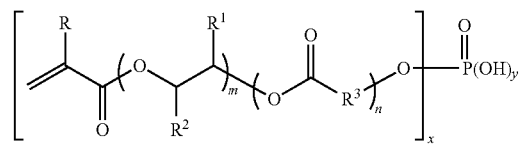

I or a salt thereof; wherein R is H or $CH_3$, wherein $R^1$ and $R^2$ are each independently H or $CH_3$, with the proviso that no two adjacent $CR^2CR^1$ groups are each substituted with methyl groups; each $R^3$ is independently linear or branched $C_2$-$C_6$ alkylene; m is from 1 to 10 and n is from 0 to 5, with the proviso that when m is 1, n is 1 to 5; x is 1 or 2; and y is 1 or 2; and x+y=3. The resultant microspheres prepared by this method are functionalized preferably with from 0.05 to 5 weight percent, based on the weight of the microspheres, of structural units of Formula I or a salt thereof.

When n is 0, x is 1, and y is 2, the polymerizable organic phosphate or salt thereof is represented by the structure of Formula II:

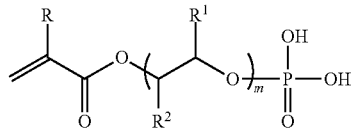

II

Preferably, one of $R^1$ and $R^2$ is H, and the other of $R^1$ and $R^2$ is $CH_3$; more preferably, each $R^2$ is H and each $R^1$ is $CH_3$; m is preferably from 3, and more preferably from 4; to preferably to 8, and more preferably to 7. Sipomer PAM-100, Sipomer PAM-200 and Sipomer PAM-600 phosphate esters are examples of commercially available compounds within the scope of the compound of Formula II.

In another aspect, where n is 1; m is 1; R is $CH_3$; $R^1$ and $R^2$ are each H; $R^3$—$(CH_2)_5$—; x is 1 or 2; y is 1 or 2; and x+y=3, the polymerizable organic phosphate or salt thereof is represented by the Structure of Formula III:

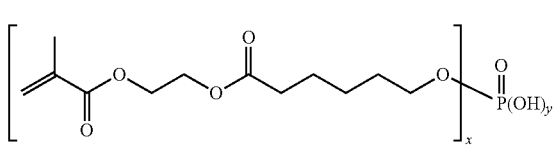

A commercially available compound within the scope of Formula III is Kayamer PM-21 phosphate ester.

In this method, the first microspheres preferably comprise from 90 to 99.9 weight percent structural units of a monoethylenically unsaturated nonionic monomer, examples of which include acrylates such as methyl acrylate, ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate. Although it is possible for the first microspheres to include structural units of carboxylic acid monomers such as methacrylic acid or acrylic acid, it is preferred that the first microspheres comprise less than 5, more preferably less than 3, and most preferably less than 1 weight percent structural units of a carboxylic acid monomer, based on the weight of the microspheres. The first microspheres more preferably comprise structural units of acrylates or methacrylates or combinations of acrylates and methacrylates.

The first microspheres are advantageously prepared from an aqueous dispersion of an oligomeric seed having a weight average molecular weight ($M_w$) in the range of from 800, preferably from 1000 g/mol to 20,000, preferably to 10,000 and most preferably to 5000 g/mol as determined by size exclusion chromatography using polystyrene standards as described herein. The oligomeric seed has an average diameter in the range of from 200 nm, more preferably from 400 nm, and most preferably from 600 nm, to 8000 nm, preferably to 5000 nm, more preferably to 1500 nm, and most preferably to 1000 nm, as determined by disc centrifuge DCP, as described herein. The oligomeric seed contains a structural of a chain transfer agent such as an alkyl mercaptan, examples of which include n-dodecyl mercaptan, 1-hexanethiol, 1-octane thiol, and 2-butyl mercaptan.

An aqueous dispersion of the oligomeric seed and a hydrophobic initiator are advantageously contacted with a first monoethylenically unsaturated monomer; alternatively, monomer can be swollen into the oligomeric seed, followed by addition of the hydrophobic initiator. The hydrophobic initiator is preferably added in the form of an aqueous dispersion. As used herein, a hydrophobic initiator refers to an initiator having a water solubility in the range of from 5 ppm, preferably from 10 ppm, to 10,000, preferably to 1000, and more preferably to 100 ppm. Examples of suitable hydrophobic initiators include such as t-amyl peroxy-2-ethylhexanoate (water solubility=17.6 mg/L at 20° C.) or t-butyl peroxy-2-ethylhexanoate (water solubility=46 mg/L at 20° C.). The extent of swelling (seed growth) can be controlled by the ratio of the monomer to the seed. Examples of suitable monoethylenically unsaturated nonionic monomers include acrylates such as ethyl acrylate, butyl acrylate, and 2-ethylhexyl acrylate; methacrylates such as methyl methacrylate, n-butyl methacrylate, t-butyl methacrylate, hydroxyethyl methacrylate, hydroxypropyl methacrylate, acetoacetoxyethyl methacrylate, and ureido methacrylate; acrylonitrile; acrylamides such as acrylamide and diacetone acrylamide; styrene; and vinyl esters such as vinyl acetate.

Forming microspheres from oligomeric seed provides an effective way of controlling the particle size distribution of the microspheres. Preferably, the coefficient of variation of the first and the second microspheres, as determined by DCP, is less than 25%, more preferably less than 20%, more preferably less than 15%, and most preferably less than 10%.

Preferably, the concentration of gel formed in the process of preparing the aqueous dispersion of second microspheres is preferably less than 0.5, more preferably less than 0.2, more preferably less than 0.1, and most preferably less 0.05 weight percent, based on the weight of the aqueous dispersion. Dispersions of microspheres with low coefficients of variation ultimately result in coatings with reliable and reproducible properties in end-use applications. In contrast, microspheres with coefficients of variation greater than 30% give coatings with unreliable and unpredictable properties.

Preferably, the $D_{50}$ particle size of the first microspheres is in the range of from 2.5 µm, more preferably from 3.0 µm, preferably to 12 µm, more preferably to 10 µm, and most preferably to 8.5 µm.

In a preferred process of preparing an aqueous dispersion of microspheres functionalized with the polymerizable organic phosphate of Structure I, the aqueous dispersion of first microspheres is contacted under polymerization conditions and in the presence of an emulsifying surfactant, such as a phosphate or an alkyl benzene sulfonate or sulfate, with first stage monomers comprising, based on the weight of the first stage monomers, from 0.05, preferably from 0.1, and more preferably from 0.2 weight percent, to 5, preferably to 3, more preferably to 2, and most preferably to 1 weight percent of the polymerizable organic phosphate of Structure I or a salt thereof; and from 70, more preferably from 80, and most preferably from 90 weight percent, to 99.95, preferably to 99.8 weight percent of a second monoethylenically unsaturated nonionic monomer. The first microspheres increase in volume (grow out) to form an aqueous dispersion of organic phosphate functionalized second microspheres having a particle size in the range of from 1.1 µm, and preferably from 2.5 µm, preferably from 3.5 µm, to 20 µm, and preferably to 15 µm.

The first stage monomer preferably further comprises a multiethylenically unsaturated nonionic monomer, preferably at a concentration in the range of from 0.1, more preferably from 1, and most preferably from 2 weight percent, to 15, more preferably to 10, and most preferably to 8 weight percent, based the weight of first stage monomers. Examples of suitable multiethylenically unsaturated nonionic monomers include allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate. The inclusion of these multiethylenically unsaturated nonionic monomers is particularly preferred where further staging of the organic phosphate functionalized second microspheres is desired.

The first stage monomer as well as the second microspheres preferably comprises a substantial absence of structural units of a carboxylic acid monomer. As used herein, a substantial absence of structural units of a carboxylic acid monomer means less than 5, preferably less than 3, more preferably less than 1, and most preferably less than 0.2 weight percent structural units of a carboxylic acid monomer such as methacrylic acid or acrylic acid, based on the weight of the microspheres.

The second microspheres preferably comprise from 90 to 98 weight percent structural units of a second monoethylenically unsaturated nonionic monomer, which may be the same as or different from the first monoethylenically unsaturated nonionic monomer. It is further preferred that a keto-functionalized monomer be included among the second monoethylenically unsaturated monomer in the same concentration range as described for the phosphorus acid functionalized polymer particles. It is understood that "monomer" refers to one or more monomers.

It is preferred that the aqueous dispersion of first microspheres is contacted under polymerization conditions with an excess of the polymerizable organic phosphate (or salt thereof) so that the resultant dispersion of organic phosphate functionalized second microspheres comprises unreacted organic phosphate. The presence of unreacted (carryover) polymerizable organic phosphate or salt thereof is especially advantageous if further staging of the second microspheres is desired. For example, it may be desirable to prepare a dispersion of second microspheres with a $T_g$ of less than 25° C., as calculated by the Fox equation, then further stage the second microspheres with carryover organic phosphate and additional monoethylenically unsaturated nonionic monomer (second stage ethylenically unsaturated nonionic monomer), which may be the same as or different from the first stage monoethylenically unsaturated nonionic monomer, to yield a dispersion of organic phosphate functionalized third microspheres with a domain having a $T_g$ of less than 25° C., and a domain with a $T_g$ of greater than 50° C.

Where an initiator/redox couple is used, it has been discovered that further formation of gel is dramatically attenuated if the polymerization is carried out at a pH that is at least one pH unit higher than the first $pK_a$ of the residual polymerizable organic phosphate. Preferably, the polymerization step to prepare the aqueous dispersion of third microspheres is carried out at a pH of from at least 3, more preferably from at least 4, more preferably from at least 5, and most preferably from at least 6, to preferably 12, more preferably to 10 and most preferably to 8. Thus, the polymerizable organic phosphate used to make the aqueous dispersion of third microspheres preferably is predominantly present in the salt form, preferably as the lithium, sodium, potassium, trialkylammonium, or ammonium salt.

Additional polymerizable organic phosphate may be added in the further staging of the second microspheres, preferably in the desired pH range where an initiator redox/couple is used. It is especially preferred to prepare the microspheres using the salt of Formula II where each $R^2$ is H and each $R^1$ is $CH_3$, or each $R^2$ is $CH_3$ and each $R^1$ is H; or Formula III.

The aqueous dispersion of polymeric microspheres resulting from Preferred Method A comprise crosslinked microspheres functionalized with from 0.05 to 5 weight percent, based on the weight of the microspheres, of structural units of Formula I.

In another preferred method of preparing an aqueous dispersion of polymeric multistage crosslinked microspheres (Preferred Method B), the aqueous dispersion of first microspheres (prepared as described in Preferred Method A) are contacted with the first stage monomer comprising from 70 to 100 weight percent of the second monoethylenically unsaturated nonionic monomer to grow out the first microspheres to form an aqueous dispersion of second microspheres, as described hereinabove, except that the polymerization is carried out in the presence of a nonionic polyalkylene oxide of a distyryl or tristyryl phenol or an anionic polyalkylene oxide salt of a distyryl or tristyryl phenol. The nonionic polyalkylene oxide or anionic polyalkylene oxide salt of a distyryl or tristyryl phenol is represented by the compound of Formula IV:

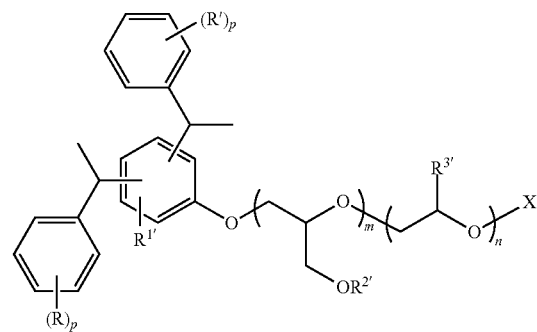

IV where each R' is independently $C_1$-$C_4$-alkyl; $R^{1'}$ is H, $CH_2CR=CH_2$, $CH=CHCH_3$, or 1-phenethyl-$(R')_p$; each $R^{2'}$ is independently H, allyl, methyl, acrylate, methacrylate, or —$CH_2CHR^3OX$; each $R^{3'}$ is independently H, methyl, or ethyl; m is 0 to 5; n is 6 to 40; p is 0, 1 or 2; and O—X is hydroxyl, methoxy, a sulfate or a phosphate. Preferably, $R^{1'}$ is 1-phenethyl-$(R')_n$; $R^{2'}$ is preferably H, $CH_3$, or allyl; m is preferably 0, 1, or 2; n is from 10 to 20; p is 0; and O—X is a sulfate or a phosphate. A more preferred polyethylene oxide salt of tristyryl phenol is represented by the compound of Formula V:

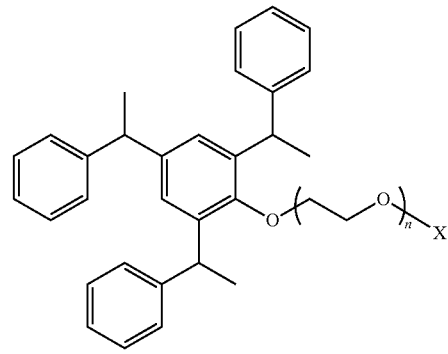

V where X is —$SO_3H$, —$SO_3Y$, —$H_2PO_3$, —$HPO_3Y$, or —$PO_3Y_2$, where Y is $Li^+$, $Na^+$, $K^+$, or $NH_4^+$. An example of a commercially available compound of Formula II is Solvay Soprophor 4D/384 ammonium salt of polyarylphenyl ether sulfate.

Another preferred ethylene oxide salt of distyryl phenol or tristyryl phenol, where m is non-zero, is represented by the compound of Formula VI.

VI

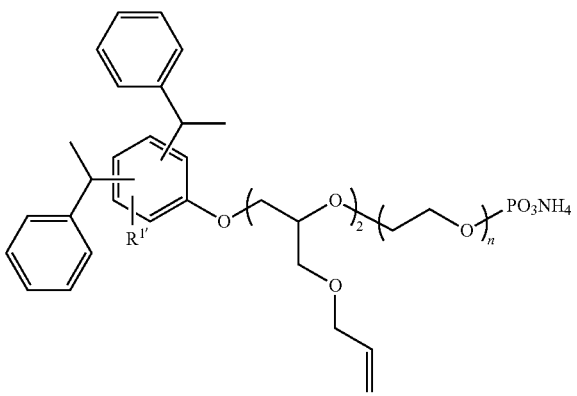

where n is preferably 12 to 18. A commercial example of the compound of Formula VI is E-Sperse RS-1684 reactive surfactant. Another example of a polyethylene oxide salt of a distyryl phenol is represented by the compound of Formula VII:

VII

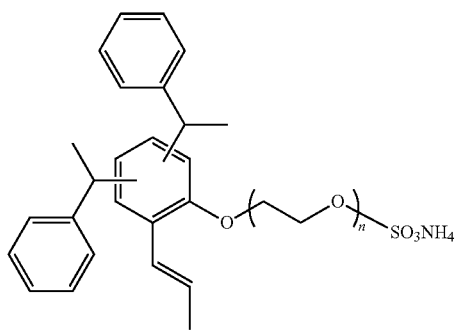

A commercial example of the compound of Formula IV is Hitenol AR-1025 reactive surfactant.

A subclass of compounds of structure IV (m=0) can be prepared by reacting distyryl or tristyryl phenol with an alkylene oxide (ethylene oxide, 1,2-propylene oxide, or 1,2-butylene oxide) in the presence of a base such as an alkali metal or alkaline earth metal hydroxide, carbonate, or bicarbonate, or an alkali metal hydride; this intermediate can then be neutralized to the corresponding glycol, methoxylated with a methyl halide, sulfonated with sulfonyl chloride, or phosphorylated with polyphosphoric acid. A compound of Formula VI can be prepared in the same manner except that the distyryl or tristyryl phenol is first reacted with an epihalohydrin such as epichlorohydrin in the presence of a base to form the corresponding monoglycidyl ether of the distyryl or tristyryl phenol prior to reaction with the alkylene oxide.

It is preferred that the aqueous dispersion of first microspheres is contacted under polymerization conditions with the salt of the compound of Formula V or an excess of the salt of the compound of Formula VI or Formula VII, so that the resultant dispersion of second microspheres preferably comprises the salt of the compound of Formula V or the salt of unreacted compound of Formula VI of Formula VII. The presence of the salt of the compound of Formula V, VI, or VII is especially advantageous if further staging of the second microspheres. For example, it may be desirable to prepare a dispersion of second microspheres with a $T_g$ of less than 25° C., as calculated by the Fox equation, then further stage the second microspheres with the salt of the compound of Formula V, VI, or VII and additional monoethylenically unsaturated nonionic monomer (second stage monoethylenically unsaturated nonionic monomer), which may be the same as of different from first stage monoethylenically unsaturated nonionic monomer, under polymerization conditions to yield a dispersion of third microspheres with a domain having a $T_g$ of less than 25° C., and a domain with a $T_g$ of greater than 50° C.

Preferably, the polymerization step to prepare the aqueous dispersion of third microspheres is carried out at a pH of from at least 3, more preferably from at least 4, more preferably from at least 5, and most preferably from at least 6, to preferably 12, more preferably to 10 and most preferably to 8.

Additional compound of Formula IV, particularly the salt of the compound of Formula IV, may be added in the further staging of the second microspheres, preferably in the desired pH range where initiator/coupler is used.

The particle size and particle size distribution of the microspheres formed by Preferred Method B is similar to the distribution achieved for Preferred Method A.

It is also possible and sometimes preferable to prepare a composition with distinctly sized microspheres each with a low coefficient of variation; such a formulation can arise, for example, from the blending of an aqueous dispersion of microspheres having a $D_{50}$ particle size of 8 μm, and an aqueous dispersion of microspheres having a $D_{50}$ particle size of 12 μm, each dispersion having a coefficient of variation of <20%, to form a bimodal dispersion of microspheres with controlled particle size in both modes.

In a preferred aspect, the aqueous dispersion of polymeric microspheres resulting from Preferred Method B comprises crosslinked microspheres functionalized with from 0.01 to 5 weight percent, based on the weight of the microspheres, of structural units of the compound of formula VI; in another preferred aspect, the composition further comprises from 0.01, preferably from 0.05, more preferably from 0.1, and most preferably from 0.2 weight percent, to 5, preferably to 3, more preferably to 2, and most preferably to 1 weight percent, based on the weight of the microspheres, of the compound of Structure V.

Preferably, polymeric organic microspheres functionalized with structural units of the compound of Formula I, Formula VI, or Formula VII, as well as compositions further comprising the compound of Formula V, comprise a substantial absence of phosphoethyl methacrylate (PEM), that is, less than 0.09, more preferably less than 0.05, more preferably less than 0.01, and most preferably 0 weight percent structural units of PEM, based on the weight of the polymeric organic microspheres.

The weight-to-weight ratio of the polymer particles to crosslinked microspheres is in the range of from 1.1:1, preferably from 1.3:1, and more preferably from 1.5:1, to 20:1, more preferably to 10:1, more preferably to 5:1, and most preferably to 3:1.

The polysiloxane is a linear and/or branched polymer comprising repeat units of Si—O—Si groups and Si-alkyl groups; the polysiloxane optionally comprises, for example, Si—O-alkyl, Si—O-aryl, Si—OH, Si—H, and/or Si—O-trialkylsilyl groups. Preferably, the polysiloxane is a linear polymer represented by the following structure:

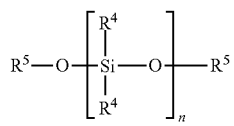

wherein each $R^4$ is independently $C_1$-$C_{30}$-alkyl, O—$C_1$-$C_6$-alkyl, or H, with the proviso that at least one $R^4$ is $C_1$-$C_{30}$-alkyl; each $R^5$ is independently $C_1$-$C_{30}$-alkyl, H, or $Si(R^6)_3$; wherein each $R^6$ is independently $C_1$-$C_6$-alkyl; and n is from 4, preferably from 10, to 10,000, preferably to 5000. Preferably, each $R^4$ is independently $C_1$-$C_6$-alkyl, more preferably ethyl or methyl, and most preferably methyl; preferably, each $R^5$ is H; and preferably $R^6$ is methyl.

The $D_{50}$ average particle size of the polysiloxane polymer particles, as measured by a Malvern Mastersizer 3000 Particle Size Analyzer, is in the range of from 1 μm, preferably from 2 μm, to 20 μm, more preferably to 15 μm, and most preferably to 10 μm.

The rheology modifier can be any thickener that is capable of controlling the viscosity of the formulation to the desired levels. Preferably, the concentration of the rheology modifier is in the range of from 0.2, more preferably from 0.5 weight percent, to preferably 3, more preferably to 2 weight percent, based on the weight of the composition. Examples of suitable rheology modifiers include hydrophobically modified ethylene oxide urethane polymers (HEURs), hydroxyethyl cellulose (HEC), alkali swellable polymers (ASEs), and hydrophobically modified alkali swellable polymers (HASEs).

The composition further comprises an opacifying pigment having a refractive index>1.9, preferably $TiO_2$. For deep base paint compositions, the pigment volume concentration (PVC) of $TiO_2$ is between 1 and 10; in such compositions, the paint further comprises from 5 to 20 weight percent solids of a non-white colorant, based on the weight of the paint composition. The colorant may be organic or inorganic; examples of organic colorants include phthalocyanine blue, phthalocyanine green, monoarylide yellow, diarylide yellow, benzimidazolone yellow, heterocyclic yellow, DAN orange, quinacridone magenta, quinacridone violet, organic reds, including metallized azo reds and nonmetallized azo reds. Inorganic colorants include carbon black, lampblack, black iron oxide, yellow iron oxide, brown iron oxide, and red iron oxide.

For non-deep base paint compositions, the preferred PVC of $TiO_2$ is in the range of from 12, more preferably from 15, to 25, more preferably to 22. $TiO_2$ PVC is defined by the following equation:

$$PVC_{(TiO2)} = (TiO_2 \text{ Vol. solids/Total Vol. Solids}) \times 100$$

where "total vol. solids" includes the contribution from $TiO_2$, extender (if present), polymer particles, and microspheres, as well as other solids (e.g., opaque polymers) that constitute the volume of the final dried coating.

Preferably the $TiO_2$ particles have a z-average particle size in the range of from 200 nm, more preferably from 250 nm, to 400 nm, more preferably to 350 nm, and most preferably to 300 nm as measured using a Brookhaven BI90 particle analyzer.

The composition of the present invention also comprises less than 10, more preferably less than 5, more preferably less than 1, and most preferably 0 weight percent of a polyurethane, more particularly dispersed polyurethane particles.

In another aspect, the composition of the present invention comprises a non-white colorant at a concentration in the range of from 5, preferably from 10 to 20 weight percent solids and a substantial absence of inorganic extenders having a refractive index in the range of 1.0 to 1.9. As used herein, "substantial absence" refers to less than 15, preferably less than 5, more preferably less than 1, and most preferably 0 PVC of any extender having a refractive index in the prescribed range. Examples of extenders substantially absent from the composition include silica, silicates and aluminosilicates such as talc, clay, mica, and sericite; $CaCO_3$; nepheline syenite; feldspar; wollastonite; kaolinite; dicalcium phosphate; and diatomaceous earth.

The composition of the present invention is conveniently prepared by mixing together an aqueous dispersion of the polymer particles (that is, a latex), with an aqueous dispersion of the polymeric organic crosslinked microspheres, an aqueous dispersion of the polysiloxane, a slurry or a powder of the opacifying white pigment, and the rheology modifier. Other additives such as coalescents, surfactants, dispersants, biocides, other opacifying pigments such as opaque polymers, colorants, waxes, defoamers, and neutralizing agents may also be included in the composition.

The composition of the present invention provides a way to make matte finish coatings with the burnish resistance of a semi-gloss paint.

EXAMPLES

Molecular Weight Determination of Acrylic Oligomer Seed

The dispersion of acrylic oligomer seed (0.1 g) were dissolved in tetrahydrofuran (THF, 8 g, HPLC grade) then filtered through 0.45 μm PTFE filters. Size Exclusion Chromatography (SEC) separations were carried out on a liquid chromatograph equipped with an Agilent 1100 Model isocratic pump, a vacuum degasser, a variable injection size autosampler, and an Agilent 1100 HPLC G1362A Refractive Index detector. The data was processed with Agilent ChemStation, version B.04.03 and Agilent GPC-Addon version B.01.01. GPC separations were carried out using THF as an eluent at a flow rate of 1 mL/min using a GPC column set composed of two PLgel Mixed D columns (300×7.5 mm ID, 5 μm) and a guard column (50×7.5 mm ID, 5 μm). Ten polystyrene standards were fitted with a 1st order fit calibration curve. The weight average molecular weights ($M_w$) of the standards were as follows: 630; 1,370; 2,930; 4,900; 10,190; 22,210; 50,550; 111,400; 214,700; and 363,600. Data was collected using a refractive index (RI) detector.

DCP Particle Sizing Methods for Acrylic Oligomer Seed and Microspheres

Particle sizes and distribution were measured using Disc Centrifuge Photosedimentometer (DCP, CPS Instruments, Inc., Prairieville, LA) that separates modes by centrifugation and sedimentation through a sucrose gradient. The samples were prepared by adding 1 to 2 drops of the oligomer seed dispersion or the microsphere dispersion into 10 mL of deionized (DI) water containing 0.1% sodium lauryl sulfate, followed by injection of 0.1 mL of the sample into a spinning disc filled with 15 g/mL of sucrose gradient. For the oligomer seed, a 0-4% sucrose gradient disc spinning at 10,000 rpm was used, and a 596-nm polystyrene calibration standard was injected prior to injection of the sample. For the microspheres, a 2-8% sucrose gradient disc spinning at 3,000 rpm was used, and 9-μm polystyrene calibration standard was injected prior to injection of the sample. Median weight average ($D_{50}$) particle size and coefficient of variation (CV) were calculated using instrument's algorithm.

Burnish Resistance Test Method

Single drawdown of each coating was made on a Leneta black vinyl chart with a 3-mil Bird applicator and then dried for 7 d at 25° C. and 50% relative humidity. After the drying period, initial gloss values were measured at three different sections over the film using BYK Micro-Tri-gloss meter. A Gardner Abrasion Tester was used to conduct the burnish test. The abrasion boat was wrapped with four layers of fresh cheesecloth and placed over the coating. The coating was scrubbed for 500 cycles with the cheesecloth wrapped abrasion boat. After completion of 500 cycles, gloss values of the coating were measured over the same three sections. Average change in 485° gloss was reported.

Intermediate Example 1—Preparation of an Aqueous Dispersion of Acrylic Beads with Phosphate Ester Addition An aqueous dispersion of acrylic oligomer seed (33% solids, 67 butyl acrylate/18 n-dodecyl mercaptan/14.8 methyl methacrylate/0.2 methacrylic acid) with a weight average median particle size ($D_{50}$) of 885 nm and a coefficient of variation of 5%, as determined by DCP, and a weight average molecular weight of 2532 g/mole was prepared substantially as described in U.S. Pat. No. 8,686,096, Examples 1 and 5 (col. 19 and 20). This seed was used to prepare the microspheres of all the Examples and Comparative Examples described herein.

Initiator emulsion was prepared by combining in a separate vial deionized water (4.9 g), Rhodacal DS-4 branched alkylbenzene sulfonate (DS-4, 0.21 g, 22.5% aq. solution), 4-hydroxy 2,2,6,6-tetramethylpiperidine (4-hydroxy TEMPO, 0.4 g, 5% aq.), t-amyl peroxy-2-ethylhexanoate (TAPEH, 5.42 g, 98% active), then emulsified for 10 min with a homogenizer at 15,000 rpm. The initiator emulsion was then added to the dispersion of the acrylic oligomer seed (4.2 g, 32% solids) in a separate vial and mixed for 60 min. A shot monomer emulsion (shot ME) was prepared in a separate flask by combining deionized water (109.5 g), Solvay Sipomer PAM-600 phosphate esters of PPG monomethacrylate (PAM-600, 2.18 g, 60% active), DS-4 (4.13 g, 22.5% solution), 4-hydroxy TEMPO (0.2 g, 5% aq.), n-butyl acrylate (BA, 234.8 g) and allyl methacrylate (ALMA, 15.1 g). Deionized water (1575 g) was added to a 5-L round bottom flask (reactor) fitted with a stirrer, condenser, and a temperature probe. The reactor was heated to 70° C., after which time the initiator and oligomer seed mixture was added to the reactor, and Shot ME was fed into the reactor over 15 min. After an induction period of 30 min, the resultant exotherm caused the reactor temperature to rise to 80° C.

A first monomer emulsion (MEL prepared by combining deionized water (328.5 g), PAM-600 (6.5 g), DS-4 (12.4 g, 22.5% solution), 4-hydroxy TEMPO (0.6 g, 5% aq.), BA (738.7 g) and ALMA (47.2 g) was then fed into the reactor over 55 min. After a 20-min hold, $NH_4OH$ (0.8 g, 28% aq.) was fed into the reactor over 3 min.

The reactor temperature was cooled to and maintained at 75° C., after which time $FeSO_4 \cdot 7H_2O$ (11 g, 0.15% aq.) and EDTA tetrasodium salt (2 g, 1% aqueous solution) were mixed and added to reactor. A second monomer emulsion (ME2) was prepared in a separate flask by combining deionized water (90 g), DS-4 (3.2 g, 22.5% solution), PAM-600 (2.20 g), methyl methacrylate (MMA, 250.0 g) and ethyl acrylate (EA, 10.5 g). ME2, t-butyl hydroperoxide solution (t-BHP, 1.44 g (70% aq.) in 100 g water) and isoascorbic acid (IAA, 1.05 g in 100 g water) was fed into the reactor over 45 min. The residual monomers were then chased by feeding t-BHP solution (2.54 g (70% aq.) in 40 g water) and IAA (1.28 g in 40 g water) into the reactor over 20 min. The consequent dispersion was filtered through a 45-μm screen; gel that remained on the screen was collected and dried (655 ppm). The filtrate was analyzed for percent solids (32.8%), coefficient of variation (<20%), and particle size (8.7 μm, as measured by DCP).

Intermediate Example 2—Preparation of Silicone Dispersion 1

DOWSIL 3-3602 PDMS (225.0 g, kinematic viscosity=80,000 centistokes (cSt) measured at 25° C.), Polystep A-16-22 sodium salt of a branched alkylbenzene sulfonic acid (A-16-22, 8.1 g, 22.0% aq. solution) and deionized water (9.6 g) were added to plastic cup (1 L size that is designed for SpeedMixer DAC 600 FVZ). The plastic cup was capped and placed in the mixer and the cup was mixed at 2350 rpm for 2 min Additional deionized water (57.4 g) was added to the cup, which was then mixed in the mixer for additional 2 min. The silicone dispersion 1 was analyzed for percent solids (75.5%), and particle size (4.6 μm, as measured by a Malvern Mastersizer 3000 Particle Size Analyzer).

Intermediate Example 3—Preparation of Silicone Dispersion 2

DOWSIL SFD-12 PDMS (225.0 g, kinematic viscosity=4000 cSt measured at 25° C.), A-16-22 (8.1 g, 22.0% aq. solution) and deionized water (9.7 g) were added to a 1-L plastic cup (designed for a SpeedMixer DAC 600 FVZ mixer). The plastic cup was capped and placed in the mixer and the cup was mixed at 2350 rpm for 2 min Additional deionized water (54.4 g) was added to the cup, which was then mixed in the mixer for additional 2 min. The silicone dispersion 2 was analyzed for percent solids (75.2%), and particle size (3.3 μm, as measured by a Malvern Mastersizer 3000 Particle Size Analyzer).

Intermediate Example 4—Preparation of Silicone Dispersion 3

XIAMETER™ OFX-5563 Fluid (4 g), TERGITOL™ 15-S-40 Surfactant (10 g), and UCON™ 75-H-90000 Lubricant (4 g) were mixed using a SpeedMixer DAC 150 FVZ mixer at 3500 rpm for 30 s. (XIAMETER, TERGITOL, and UCON are Trademarks of The Dow Chemical Company or Its Affiliates.)

A portion of this mixture (12.6 g) was combined with an am-hydroxyl terminated polydimethylsiloxane (35 g, kinematic viscosity=20 million cSt), and glass beads (16 g, 3 mm diameter). The contents were mixed at 3500 rpm for 2 min, then allowed to cool to room temperature; mixing was then repeated for another 2 min Water (2.5 g) was then added to the mixture and the contents were mixed at 3500 rpm for 1 min. Additional water (19.7 g) was added in three parts, each addition followed by mixing at 3500 rpm for 30 s; the resultant dispersion (68% solids) had a volume average median diameter of 3.5 μm, as measured by a Malvern Masterizer 3000 particle analyzer.

Comparative Example 1—Preparation of a Paint without Polyorganosiloxane

RHOPLEX™ VSR-1049LOE Acrylic Emulsion (194.99 g) and the Intermediate Example 1 acrylic beads (116.99 g) were mixed together in a 0.5-L container with overhead stirring for 2 min followed by slow addition of Kronos 4311 $TiO_2$ (131.42 g). Mixing was continued for 5 min, after which time Texanol coalescent (5.19 g) and BYK-022 defoamer (0.13 g) were added slowly to the mixture. Mixing was continued for an additional 2 to 3 min, whereupon the stirring speed was increased; ACRYSOL™ RM-2020 NPR Rheology Modifier (14.15 g) was then added slowly, followed by addition under high speed stirring of ACRYSOL™ RM-8W Rheology Modifier (2.23 g) and water (42.50 g); 28% aqueous ammonia (0.11 g) was then added, and mixing was continued for an additional 5 to 10 min. The final mixture was a pigmented, microsphere containing paint. (ACRYSOL and RHOPLEX are Trademarks of The Dow Chemical Company or its Affiliates.)

Comparative Example 2—Preparation of a Paint with a Water-Soluble Polyorganosiloxane DOWSIL™ 402 LS Polyorganosiloxane (0.20 g) was post-added with stirring to a portion of the Comparative Example 1 formulation (70.0 g). Inasmuch as this polyorganosiloxane was water-soluble, it did not form a dispersion of discrete particles.

Comparative Example 3—Preparation of a Paint with <1-Micron Sized Polyorganosiloxane Particles ROSILK™ 2000 Polyorganosiloxane (0.454 g, $D_{50}$ particle size=0.5 μm) was post-added with stirring to a portion of the Comparative Example 1 formulation (70.0 g).

P Example 1—Preparation of a Paint with >1-μm Sized Polyorganosiloxanes

Silicone dispersion 1 (0.27 g) was post-added with stirring to a portion of the Comparative Example 1 formulation (70.0 g).

Example 2—Preparation of a Paint with >1-μm Sized Polyorganosiloxanes

Silicone Dispersion 2 (0.27 g) was post-added with stirring to a portion of the Comparative Example 1 formulation (70.0 g).

Example 3—Preparation of a Paint with >1-μm Sized Polyorganosiloxane Microspheres Silicone Dispersion 3 (0.30 g, ~4 μm) was post-added with stirring to a portion of the Comparative Example 1 formulation (70.0 g).

Table 1 illustrates the impact of polyorganosiloxane additives on burnish resistance. Additive refers to the polyorganosiloxane additive. The additive weight percent is 1 weight percent based on binder solids and acrylic beads in all examples where an additive is used.

TABLE 1

| Paint ID | Additive | Δ85° (avg) | std |
|---|---|---|---|
| Comp Ex 1 | None | 10.2 | 0.4 |
| Comp Ex 2 | DOWSIL™ 402 LS | 3.1 | 0.3 |
| Comp Ex 3 | ROSILK™ 2000 | 3.6 | 0.3 |
| Example 1 | Silicone Dispersion 1 | 1.0 | 0.2 |
| Example 2 | Silicone Dispersion 2 | 0.5 | 0.0 |
| Example 3 | Silicone Dispersion 3 | 1.0 | 0.2 |

Burnish Resistance Data

The results show significant improvement in burnish resistance in the presence of silicone dispersions where the particle size of the silicone was >1 μm. Significantly, the molecular weight of the silicone additive did not have any notable impact on burnish resistance, suggesting that a wide variety of polysiloxanes are effective provided the particle size is >1 μm.

The invention claimed is:

1. A paint composition comprising an aqueous dispersion of:
   a) polymer particles having a z-average particle size in the range of from 80 nm to 500 nm;
   b) polymeric organic crosslinked microspheres having an average particle size in the range of from 1 μm to 20 μm;
   c) polysiloxane particles having an average particle size in the range of from 1 μm to 30 μm;
   d) a rheology modifier;
   e) an opacifying white pigment having a refractive index of >1.9 at a pigment volume concentration in the range of from 1 to 30, with the proviso that when the pigment volume concentration of the opacifying white pigment is less than 10, the paint composition comprises a non-white colorant in the range of from 5 to 20 weight percent solids based on the weight of the paint composition; and
   f) less than 10 weight percent, based on the weight of the polymer particles, of a polyurethane having a $T_g<0°$ C.;
   wherein the concentration of the polymer particles and the crosslinked microspheres is in the range of 10 to 65 weight percent, based on the weight of the paint composition;
   wherein weight-to-weight ratio of polymer particles to crosslinked microspheres is in the range of 1.1:1 to 20:1; the concentration of polysiloxane particles is in the range from 0.05 to 5 weight percent, based on the weight of the paint composition; and the concentration of the rheology modifier is in the range of from 0.1 to 5 weight percent, based on the weight of the paint composition.

2. The paint composition of claim 1 wherein the polysiloxane is a linear polymer represented by the following structure:

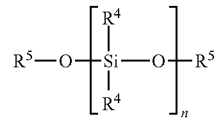

wherein each $R^4$ is independently $C_1$-$C_{30}$-alkyl, O—$C_1$-$C_6$-alkyl, or H, with the proviso that at least one $R^4$ is $C_1$-$C_{30}$-alkyl; each $R^5$ is independently $C_1$-$C_{30}$-alkyl, H, or Si(R$^6$)$_3$; wherein each R$^6$ is independently C$_1$-C$_6$-alkyl; and n is from 4 to 10,000.

3. The paint composition of claim 1 wherein a) the polymer particles are acrylic based polymer particles having a T$_g$<20° C.; and b) the polymeric organic crosslinked microspheres comprise a first stage crosslinked polymer having a T$_g$≤20° C.; and a second stage having a T$_g$>30° C.; wherein the median weight average particle size of the polymeric organic microspheres is in the range of from 2 μm to 15 μm.

4. The paint composition of claim 2 wherein the wherein weight-to-weight ratio of polymer particles to crosslinked microspheres is in the range of 1.3:1 to 10:1; the polymer particles comprise at least 30 weight percent, based on the weight of the polymer particles, of structural units of one or more methacrylate and/or acrylate monomers; wherein each R$^4$ is independently methyl or ethyl.

5. The paint composition of claim 4 wherein the polymer particles further comprise from 0.05 to 12 weight percent structural units of a monomer with keto functionality, based on the weight of the polymer particles and the polymeric organic microspheres, and the composition further comprises from 0.1 to less than 10 weight percent, based on the weight of the polymer particles and the polymeric organic microspheres, of a dihydrazide of polyamine crosslinking agent.

6. The paint composition of claim 4 wherein the opacifying white pigment having a refractive index of >1.9 is TiO$_2$ at a PVC in the range of 12 to 22; wherein each R$^4$ is independently methyl.

7. The paint composition of claim 5 wherein at least 50 weight of the first stage of the crosslinked microspheres comprises structural units of butyl acrylate and a multiethylenically unsaturated nonionic monomer, wherein the weight-to-weight ratio of butyl acrylate to the multiethylenically unsaturated nonionic monomer is in the range of from 99.5:0.5 to 90:10; wherein the second stage comprises methyl methacrylate homopolymer.

8. The paint composition of claim 2 wherein the polymeric organic crosslinked microspheres have an average particle size in the range of from 2 μm to 15 μm, wherein the polymeric organic microspheres are functionalized with from 0.05 to 5 weight percent, based on the weight of the microspheres, of structural units of the compound of Formula I:

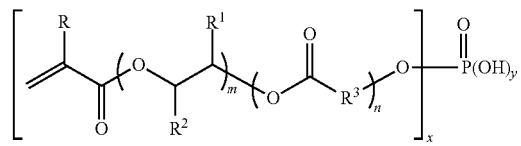

or a salt thereof; wherein R is H or CH$_3$, wherein R$^1$ and R$^2$ are each independently H or CH$_3$, with the proviso that no two adjacent CR$^2$CR$^1$ groups are each substituted with methyl groups; each R$^3$ is independently linear or branched C$_2$-C$_6$ alkylene; m is from 1 to 10 and n is from 0 to 5, with the proviso that when m is 1, n is 1 to 5; x is 1 or 2; and y is 1 or 2; and x+y=3.

9. The paint composition of claim 1, wherein the opacifying white pigment having a refractive index of >1.9 is TiO$_2$ at a PVC in the range of 1 to 10; wherein the paint composition further comprises a non-white colorant in the range of from 5 to 20 weight percent solids based on the weight of the paint composition and less than 15 PVC of an inorganic extender having a refractive index in the range of 1.0 to 1.9.

10. The composition of claim 2 which further includes one or more additives selected from the group consisting of coalescents, surfactants, dispersants, biocides, opaque polymers, colorants, waxes, defoamers, and neutralizing agents.

* * * * *